United States Patent [19]
Nomura

[11] 4,289,162
[45] Sep. 15, 1981

[54] FLUID RESERVOIR FOR BRAKE MASTER CYLINDER

[75] Inventor: Yoshihisa Nomura, Toyota, Japan

[73] Assignee: Toyota Jidosha Kogyo Kabushiki Kaisha, Aichi, Japan

[21] Appl. No.: 135,096

[22] Filed: Mar. 28, 1980

[30] Foreign Application Priority Data

Jun. 29, 1979 [JP] Japan ............................ 54/90579[U]

[51] Int. Cl.³ .............................................. F15B 7/10
[52] U.S. Cl. ...................................... 137/572; 60/535; 60/586; 60/592
[58] Field of Search ................. 60/534, 535, 585, 592, 60/586; 137/572

[56] References Cited

U.S. PATENT DOCUMENTS

| | | | |
|---|---|---|---|
| 4,181,147 | 1/1980 | Fujii | 60/592 |
| 4,192,345 | 3/1980 | Fujii | 60/592 |

Primary Examiner—Abraham Hershkovitz
Attorney, Agent, or Firm—Armstrong, Nikaido, Marmelstein & Kubovcik

[57] ABSTRACT

In a fluid reservoir for a brake master cylinder, a cap is coupled over the upper opening of a reservoir casing, and an extendable diaphragm seal member is coupled in a fluid-tight manner within the casing to subdivide the interior space of the casing into upper and lower chambers. The cap is provided at its center with a vertical rod extending into the casing and having a pair of axially spaced recesses at its intermediate portion, the seal member is provided at its inner periphery with an annular valve part movable along the intermediate portion of the rod and cooperating with the recesses to permit the flow of air to and from the lower chamber, and the valve part is normally retained between the recesses to close the lower chamber.

5 Claims, 5 Drawing Figures

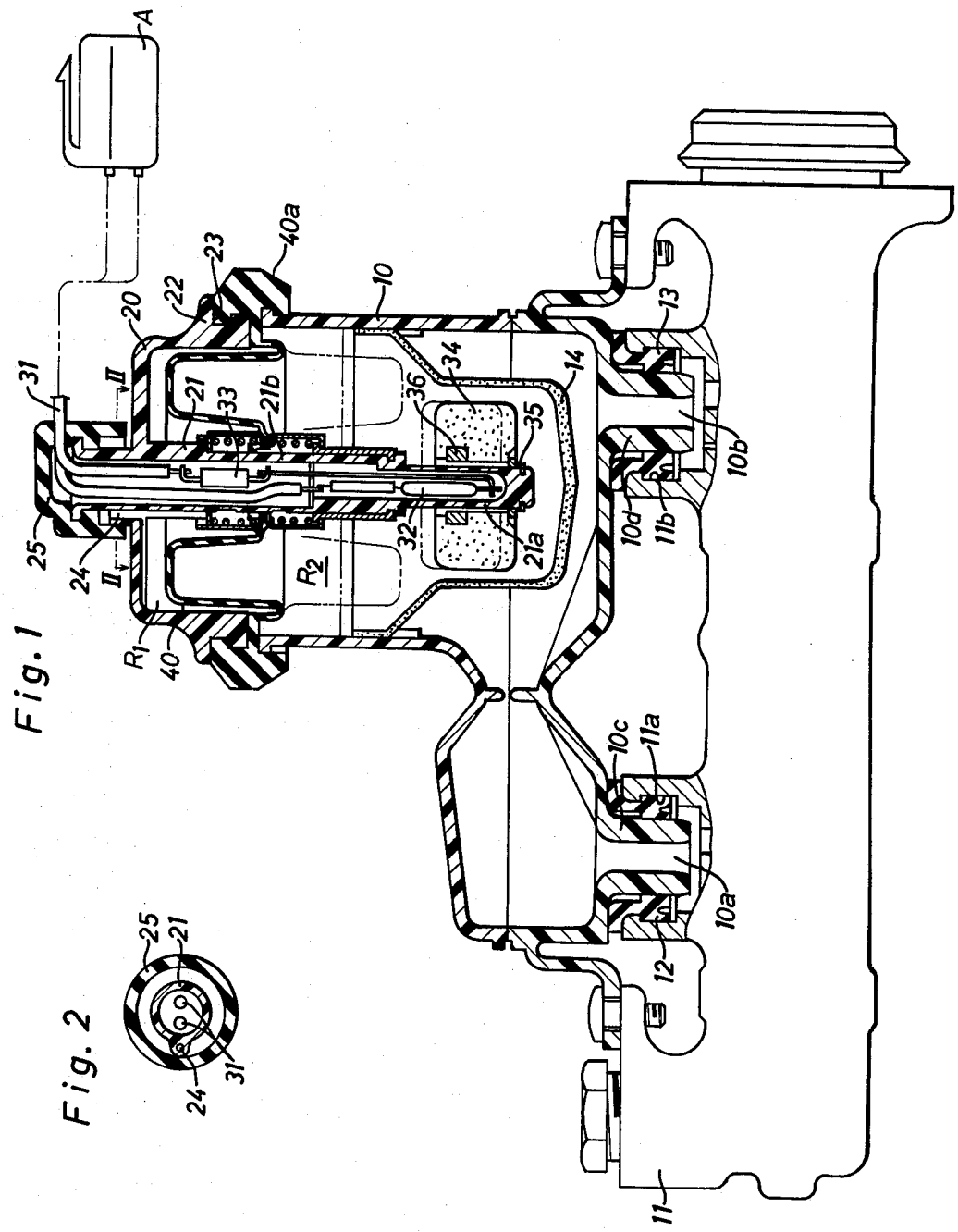

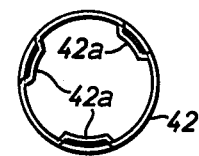
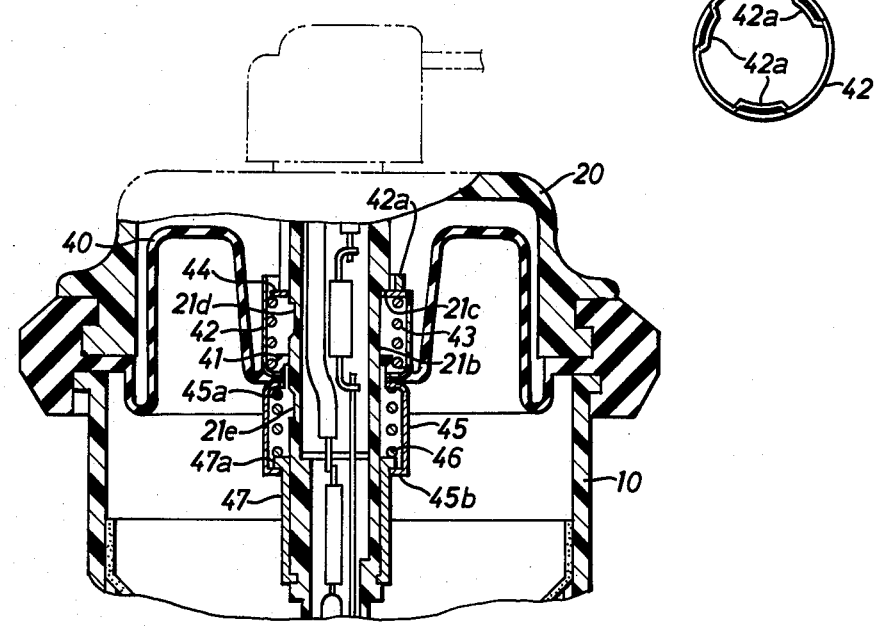
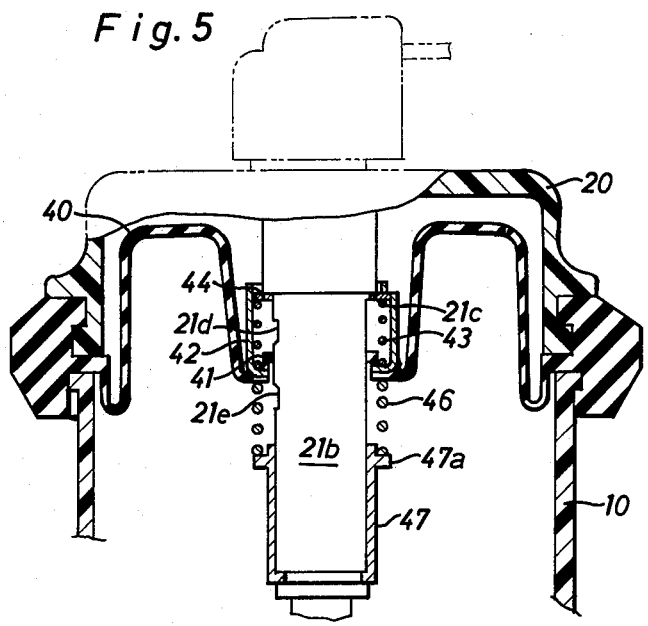

FLUID RESERVOIR FOR BRAKE MASTER CYLINDER

BACKGROUND OF THE INVENTION

The present invention relates to a fluid reservoir for mounting on a brake master cylinder, and more particularly to a fluid reservoir of the type which includes an extendable diaphragm seal member coupled within a reservoir casing in a fluid-tight manner to close off brake fluid stored in the casing from the surrounding air.

In such a conventional fluid reservoir as described above, the diaphragm seal member is extended upward or downward in accordance with inflation or deflation of the air in the closed space to maintain the pressure in the closed space substantially at the atmospheric pressure. If the pressure in the closed space becomes positive or negative pressure under maximum extension of the diaphragm seal member, it is well known that unexpected troubles will occur in the vehicle braking system. To solve the problems, a conventional diaphragm seal member is provided thereon with inlet and outlet check valves which act to permit the flow of air to and from the closed space. However, it is difficult to uniform the performance of the fluid reservoir by provision of the inlet and outlet check valves.

SUMMARY OF THE INVENTION

It is, therefore, the primary object of the present invention to provide a fluid reservoir in which a valve assembly is adapted to the diaphragm seal member to uniform the performance of the fluid reservoir as easily as possible.

Accordingly, in a preferred embodiment of the present invention, a cap is detachably coupled over the upper opening of a reservoir casing, and an extendable diaphragm seal member is coupled in a fluid-tight manner within the casing to close off brake fluid stored in the casing from the surrounding air, the seal member subdividing the interior space of the casing into an upper chamber vented through a portion of the cap and a lower chamber located above the liquid surface of the brake fluid. The cap is provided at its center with a vertical rod extending axially into the casing and having a pair of axially spaced recesses at its intermediate portion, the diaphragm seal member is provided at its inner periphery with an annular valve part movable along the intermediate portion of the rod and cooperating with the recesses to permit the flow of air to and from the lower chamber, and the valve part of the diaphragm seal member is resiliently retained to be positioned between the recesses to normally close the lower chamber.

In operation, when negative pressure appears in the lower chamber under maximum extension of the diaphragm seal member in the downward direction, the valve part cooperates with the lower recess of the rod to permit the flow of air into the lower chamber from the upper chamber. When positive pressure appears in the lower chamber under maximum extension of the diaphragm seal member in the upward direction, the valve part cooperates with the upper recess of the rod to permit the low of air from the lower chamber into the upper chamber.

In actual practice of the present invention, preferably the valve part of the diaphragm seal member is resiliently supported in place by first and second coil springs which are concentrically assembled with the vertical rod, the first spring being loaded to bias the valve part in the downward direction, and the second spring being loaded to bias the valve part in the upward direction.

BRIEF DESCRIPTION OF THE DRAWINGS

Additional objects and advantages of the present invention will be more readily apparent from the following detailed description of preferred embodiments thereof when taken together with the accompanying drawings in which:

FIG. 1 is an elevational view, in partially in section, of a brake master cylinder with a fluid reservoir in accordance with the present invention;

FIG. 2 is a cross-sectional view taken along line II—II of FIG. 1;

FIG. 3 is an enlarged view for clearly showing an annular valve part of the diaphragm seal member of FIG. 1;

FIG. 4 illustrates the upper end of a spring receiver shown in FIG. 3; and

FIG. 5 illustrates a modification of the fluid reservoir shown in FIG. 1.

DESCRIPTION OF THE PREFERRED EMBODIMENTS

Referring now to the drawings, particularly in FIG. 1, a reservoir casing 10 is mounted on a brake master cylinder 11 to constantly store an amount of brake fluid therein as a supply for the master clyinder. The reservoir casing 10 is provided at its bottom portion with tubular bosses 10c and 10d which are coupled in a fluid-tight manner within ports 11a and 11b of the master cylinder 11 via annular seal members 12 and 13 respectively, the bosses 10c, 10d forming respective ports 10a and 10b of the reservoir casing 10. Within the casing 10 and oil strainer 14 is provided to filter out contaminants which may enter into the casing 10. The upper opening of casing 10 is closed in a fluid-tight manner by a main cap 20 with an extendable diaphragm seal member 40 coupled thereto.

The main cap 20 is made of hard synthetic resin and integrally formed at its center with a stepped tubular rod 21 which extends vertically into the casing 10. The main cap 20 is provided at its outer periphery with an annular flange 22 which is formed with an annular groove 23 for coupling with an annular rim 40a of diaphragm seal member 40. A vertical vent hole 24 is provided along the left side of tubular rod 21 to connect the interior of main cap 20 to the exterior. (see FIG. 2) A sub-cap 25 is coupled on the head of tubular rod 21 to cover the upper opening of vent hole 24, which communicates with the exterior through the lower opening of sub-cap 25 around the head of tubular rod 21.

The tubular rod 21 has a closed bottom and extends downward through an aperture in a float 34 which is positioned to float adjacent to the tubular rod on brake fluid stored in the casing 10. The tubular rod 21 is provided therein adjacent to the lower end portion 21a thereof with a magnetically operable switch 32 in the form of a normally open reed switch which is connected through a resistor 33 to an external warning device A by way of lead wires 31 to issue a warning signal should a dangerous decrease in the quantity of brake fluid occur. The float 34 is arranged in the casing 10 for upward and downward movements in response to variations in the brake fluid level in the casing 10 and has a ring-shaped permanent magnet 36 secured thereon. The upward movement of float 34 is restricted by an upper stopper in the form of a lower stepped portion of rod 21, and the downward movement of float 34 is restricted by a stopper 35 fixed to the lower end of rod 21. Thus, the float 34 is retained by buoyancy in the upper position when adequate brake fluid is stored in the casing 10 and moves down in accordance with a fall in the level of the brake fluid. When the level of the brake fluid drops below a minimum fluid level, the float 34 engages the lower stopper 35 and the reed switch 32 closes due to the magnetic force of permanent magnet 36 of float 34 to energize the warning device so as to warn the driver of the shortage of brake fluid.

The diaphragm seal member 40 is made of elastic material such as synthetic rubber and detachably coupled over the upper opening of casing 10 at its annular rim 40a. The diaphragm seal member 40 resiliently engages at its inner peripheral rim with an intermediate portion 21b of rod 21 to form upper and lower chambers $R_1$ and $R_2$. The upper chamber $R_1$ is in open communication with the exterior through the vertical vent hole 24, and the lower chamber $R_2$ is formed above the liquid surface of brake fluid in the casing 10. As can be well seen in FIG. 3, the inner peripheral rim of diaphragm seal member 40 is formed as an annular valve part 41, and a first cylindrical spring receiver 42 is integrally secured at its bottom flange to the valve part 41 to contain a first coil spring 43 therein. The valve part 41 is movable along the intermediate portion 21b of rod 21 in the upward and downward directions. The coil spring 43 is assembled within receiver 42 concentrically with tubular rod 21 and is compressed with a predetermined load to bias the valve part 41 downward. As shown in FIG. 4, the spring receiver 42 is provided with three equidistantly spaced lugs 42a projecting radially inwardly from the upper end of receiver 42. The coil spring 43 is engaged at its upper end with the three lugs 42a through an annular retainer 44 and at its lower end with the bottom flange of receiver 42. The annular retainer 44 is movable along the intermediate portion 21b of rod 21 and abuts against an upper stepped portion 21c of rod 21 due to biasing force of coil spring 43 in the figure.

In this embodiment, the valve part 41 of diaphragm seal member 40 is resiliently received by a second cylindrical spring receiver 45 under biasing force of a second coil spring 46. The spring receiver 45 has an upper flange 45a receiving the valve part 41 thereon and a lower flange 45b in engagement with the upper flange 47a of a cylindrical retainer 47 fixed to the intermediate portion 21b of rod 21. The spring 46 has a predetermined spring constant and is assembled with a predetermined load by engagement at its upper end with the upper flange 45a of receiver 45 and its lower end with the upper flange 47a of retainer 47. From the above description, it will be noted that the valve part 41 of diaphragm seal member 40 is positioned in place by opposite biasing forces of the springs 43 and 46.

For permitting the flow of air to and from the lower chamber $R_2$, the intermediate portion 21b of rod 21 is provided with upper and lower axially spaced recesses 21d and 21e which are located respectively above and below the valve part 41 of diaphragm seal member 40 with a predetermined distance. When the valve part 41 is coupled over the upper recess 21d by upward movement against biasing force of the spring 43, the upper recess 21d provides a communication between upper and lower chambers $R_1$ and $R_2$. When the valve part 41 is coupled over the lower recess 21e by downward movement against biasing force of the spring 46, the lower recess 21e provides a communication between chambers $R_1$ and $R_2$.

In use of the fluid reservoir described above, when the diaphragm seal member 40 is expanded in its flexible range in accordance with inflation or deflation of the air in lower chamber $R_2$ caused by changes of the fluid level and/or the ambient temperature, the valve part 41 is retained in the assembled position due to opposite biasing forces of the springs 43 and 46 to maintain the pressure in chamber $R_2$ substantially at the atmospheric pressure under the sealed condition. When the pressure in chamber $R_2$ increases by inflation of the air caused by a rise in the ambient temperature after the diaphragm seal member 40 is expanded upward to a maximum flexible extent, as shown by a solid line in FIG. 1, the valve part 41 is moved upward by the increased pressure against the resilient force of spring 43 and separated from the upper flange 45a of spring receiver 45. In this instance, the spring receiver 42 is guided by the annular retainer 44 to smoothly conduct the upward movement of valve part 41. Then, the valve part 41 is coupled over the upper recess 21d to connect the lower chamber $R_2$ to the upper chamber $R_1$. This permits the flow of air from the lower chamber $R_2$ into the upper chamber $R_1$ to restrain the increase of pressure in chamber $R_2$ in a maximum allowable positive pressure value. Thereafter, the valve part 41 is moved downward by biasing force of the spring 43 and engages the outer periphery of rod 21 to hermetically close the lower chamber $R_2$.

When the pressure in chamber $R_2$ decreases by lowering of the fluid level or deflection of the air caused by a fall in the ambient temperature after the diaphragm seal member 40 is expanded downward to the maximum flexible extent, as shown by an imaginary line in FIG. 1, the valve part 41, spring receive 42, spring 43 and retainer 44 are unitedly moved downward by the negative pressure against the resilient force of spring 46. In this instance, the annular retainer 44 is guided by the intermediate portion 21b of rod 21 to smoothly conduct the downward movement of valve part 41. Then, the valve part 41 is coupled over the lower recess 21e to connect the lower chamber $R_2$ to the upper chamber $R_1$. This permits the flow of air from the upper chamber $R_1$ into the lower chamber $R_2$ to restrain the decrease of pressure in chamber $R_2$ in a maximum allowable negative pressure value. Thereafter, the valve part 41 is moved upward by biasing force of the spring 46 together with the spring receiver 42, spring 43 and retainer 44, and it engages the outer periphery of rod 21 to hermetically close the lower chamber $R_2$. In addition, when the level of fluid in the casing 10 drops below a minimum fluid level, the float 34 moves downward in response to lowering of the fluid level and the reed switch 32 is closed due to the magnetic force of permanent magnet 36 to issue a warning signal. This energizes the warning device A to warn the driver of the shortage of brake fluid.

From the above description, it will be understood that the valve part 41 of diaphragm seal member 40 acts to reliably prevent the entrance of water into the brake fluid and that appropriate setting of each spring constant and pre-load of the springs 43 and 46 serves to maintain the pressure in chamber $R_2$ substantially in each maximum allowable pressure value. Furthermore, the above embodiment is characterized in that each preload of the springs 43 and 46 is determined within the respective spring receivers 42 and 45 for independently setting the maximum allowable positive and negative pressure values in the lower chamber $R_2$.

In practice of the present invention, the second spring receiver 45 may be eliminated as shown in FIG. 5. Alternatively, the springs 43 and 46 may be replaced with a single coil spring which is connected at its one end with the intermediate portion 21b of rod 21 and at its other end with the valve part 41 to resiliently retain the valve part 41 in the assembled position. It is also noted that the present invention may be adapted to various fluid reservoirs of such a diaphragm type as described above.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A fluid reservoir for mounting on a brake master cylinder, the reservoir comprising:

a casing for storing an amount of brake fluid therein, said casing having an upper opening;

a cap detachably coupled over the upper opening of said casing to close said casing, said cap being provided at the center thereof with a vertical rod extending axially into said casing and having a pair of axially spaced recesses at its intermediate portion;

an extendable diaphragm seal member coupled in a fluid-tight manner within said casing to subdivide the interior space of said casing into an upper chamber vented through a portion of said cap and a lower chamber located above the liquid surface of the brake fluid, said diaphragm seal member being provided at its inner periphery with an annular valve part movable along the intermediate portion of said vertical rod and cooperating with the recesses of said rod to permit the flow of air to and from the lower chamber;

resilient means for normally retaining the valve part of said diaphragm seal member between the recesses of said rod to close the lower chamber wherein said resilient means comprises first and second coil springs concentrically assembled with said vertical rod, said first spring being loaded to bias the valve part of said diaphragm seal member in the downward direction, and said second spring being loaded to bias the valve part of said diaphragm seal member in the upward direction; and a cylindrical spring receiver concentrically assembled with said vertical rod to contain said first spring therein and secured at its lower end to the valve part of said diaphragm seal member, and an annular retainer engaged with a stepped portion of said vertical rod and received by an upper end portion of said receiver in such a manner that upward movement of said receiver is guided by said retainer, and wherein said first spring is disposed with a predetermined load between the lower end of said receiver and said retainer.

2. A fluid reservoir as set forth in claim 1, further comprising a second cylindrical spring receiver concentrically assembled with said vertical rod to contain said second spring therein and secured at its upper end to the valve part of said diaphragm seal member, and wherein said second spring is disposed with a predetermined load between the upper end of said second receiver and a stepped portion of said vertical rod.

3. A fluid reservoir as set forth in claim 2, wherein said second spring receiver is provided at its lower end with an annular flange to be guided by the intermediate portion of said vertical rod.

4. A fluid reservoir as set forth in claim 1, wherein said diaphragm seal member is integrally coupled at its outer periphery with said cap to be coupled over the upper opening of said casing in a fluid-tight manner.

5. A fluid reservoir as set forth in claim 1, wherein said vertical rod is in the form of a tubular rod, and further comprising warning means which includes a magnetically operable switch located adjacent to the lower end of said vertical rod and connected to an external warning device for issuing a warning signal, a float floatable on the brake fluid and located adjacent to said vertical rod, a permanent magnet mounted on said float and movable therewith to activate the switch when the level of brake fluid in said casing falls below a predetermined minimum level, and stop means on said vertical rod to restrict upward movement of said float.

* * * * *